United States Patent
Wittekind et al.

(10) Patent No.: US 11,747,460 B2
(45) Date of Patent: Sep. 5, 2023

(54) APPARATUS AND METHOD FOR COMPENSATING FOR DOPPLER EXPANSIONS

(71) Applicant: Hensoldt Sensors GmbH, Taufkirchen (DE)

(72) Inventors: Wolfgang C. Wittekind, Laupheim (DE); Stefan Beer, Elchingen (DE); Peter Feil, Neu-Ulm (DE)

(73) Assignee: Hensoldt Sensors GmbH, Taufkirchen (DE)

( * ) Notice: Subject to any disclaimer, the term of this patent is extended or adjusted under 35 U.S.C. 154(b) by 296 days.

(21) Appl. No.: 17/368,873

(22) Filed: Jul. 7, 2021

(65) Prior Publication Data
US 2022/0011424 A1  Jan. 13, 2022

(30) Foreign Application Priority Data
Jul. 7, 2020 (EP) .................................... 20184520

(51) Int. Cl.
*G01S 13/44* (2006.01)
*G01S 7/40* (2006.01)
*G01S 7/04* (2006.01)
*G01S 13/95* (2006.01)

(52) U.S. Cl.
CPC .............. *G01S 13/449* (2013.01); *G01S 7/04* (2013.01); *G01S 7/403* (2021.05); *G01S 13/4463* (2013.01); *G01S 13/953* (2013.01)

(58) Field of Classification Search
CPC .. G01S 13/18; G01S 13/4454; G01S 13/4463; G01S 13/449; G01S 13/582; G01S 13/60; G01S 13/953; G01S 7/04; G01S 7/2921; G01S 7/403; G01S 7/415; Y02A 90/10
See application file for complete search history.

(56) References Cited

U.S. PATENT DOCUMENTS

| | | | | |
|---|---|---|---|---|
| 2005/0179579 A1* | 8/2005 | Pinder | ................... | G01S 7/2926 342/25 R |
| 2019/0049572 A1* | 2/2019 | Hong | .................... | G01S 13/584 |
| 2023/0161027 A1* | 5/2023 | Amihood | ................ | G01S 7/023 342/109 |

FOREIGN PATENT DOCUMENTS

CN   106054195 B   7/2018

OTHER PUBLICATIONS

Yadin E: "A performance noitaulavemodel for a two port interferometer SAR-MTI", the Proceedings of the 1996 IEEE National Radar Conference: Held at the University of Michigan, Ann Arbor, Michigan, May 13-16, 1996, IEEE, New York, NY, USA.

* cited by examiner

Primary Examiner — Timothy X Pham

(57) ABSTRACT

An apparatus (100) for compensating for weather-independent Doppler expansions in radar signals of a weather radar system (200) is disclosed. The device comprises: a receiving device (110) for receiving a representation (50) of the radar signals, a calculation device (120) and a compensation device (130). The representation includes pixels of a range Doppler matrix. The calculation device (120) is designed to calculate azimuth angles (Azi) for the pixels (75) by means of fine bearing. The compensation device (130) is designed to correct weather-independent Doppler shifts for the pixels (75) based on the calculated azimuth angle (Azi; AziMopu) and thus to compensate for the weather-independent Doppler expansions and to provide them as a compensated representation (150).

14 Claims, 7 Drawing Sheets

APPARATUS AND METHOD FOR COMPENSATING FOR DOPPLER EXPANSIONS

The present invention relates to an apparatus and a method for compensating for weather-independent Doppler expansions in radar signals of a weather radar, for example as a result of intrinsic movements, and in particular to turbulence detection by means of fine bearing. The invention also relates to compensations of beam width-related Doppler expansions of radar signals from fast-flying small radar systems in order to autonomously detect critical rainy areas that should not be flown through.

BACKGROUND

A characteristic of critical weather situations is often air movements that move at high speed in different directions (as a result of self-rotation, shear winds, turbulence, etc.). The different directions of movement lead to different Doppler shifts and thus to a Doppler expansion for a used frequency.

The strength of the Doppler expansion can be viewed as an indication of turbulent weather situations, which can be detected, for example, by so-called pulse Doppler radar methods. If a critical value is exceeded, this can be assessed as a potentially dangerous situation. For example, extreme tornadoes show very high Doppler widenings in very small spatial areas, since circulating air currents move at high speed on the one hand towards a radar system and on the other hand move away from the radar system and thus cause contrary Doppler shifts.

Conventional weather radar systems have so far used ground-based systems without airspeed, which have large antennas with narrow antenna lobes. However, there is an ongoing need to use high-quality weather radar systems on aircraft (e.g. drones, airplanes) so that the weather situation in the direction of flight can then be continuously monitored independently of ground stations and extreme weather situations such as tornadoes can be avoided.

However, moving weather radar systems have the following problems. The intrinsic movement of the aircraft itself leads to Doppler expansions due to the airspeed of the weather radar system, which can negatively influence the image of the recorded weather situation. The same effect is caused by the beam width of the radar signals. Here, too, there are different relative speeds within the radar beam in the case of offsets and thus an inherent Doppler expansion. However, these Doppler expansions are not dependent on the weather and occur independently of the weather. They therefore interfere with the detection of critical weather situations.

There is therefore a need for apparatuses for compensating for the weather-independent Doppler expansions in radar signals.

BRIEF DESCRIPTION OF THE INVENTION

The above task is solved by an apparatus according to claim 1 and a method according to claim 13. The dependent claims relate to advantageous developments of the apparatus according to claim 1.

The present invention relates to an apparatus for compensating for weather-independent Doppler expansions in radar signals of a weather radar system. The device comprises: a receiving device for receiving a representation of the radar signals, a calculation device, and a compensation device. The representation comprises pixels of a range Doppler matrix. The calculation device is designed to calculate azimuth angles for the pixels (which e.g. belong to different Doppler values) by means of fine bearing. The compensation device is designed to correct weather-independent Doppler shifts for the pixels based on the calculated azimuth angle and thus to compensate for the weather-independent Doppler expansions and to provide them as a compensated representation.

It is understood that the term the pixels includes, here and in the following, in particular the case that all pixels are considered during the fine bearing or the compensation. This is usually the preferred embodiment. However, it is not absolutely necessary to consider all pixels; individual pixels can also be irrelevant in a specific case.

The range Doppler matrix relates local relative velocities (expressed by Doppler shift values) in a beam and distance values. The value range of the Doppler values is usually not continuous, but divided into discrete ranges (so-called Doppler gates). The same can apply to the distance, which is discretized in gates. The compensated representation can be transmitted to an evaluation unit (for example the weather radar system or another unit) in order to evaluate the situation there. For example, the following questions can be answered here: How critical is the weather situation? Are evasive maneuvers to be carried out? Should a warning be given?

Optionally, the calculation device is designed to use a phase monopulse method for fine bearing.

Optionally, the compensation device is designed to take into account one or more of the following causes for the weather-independent Doppler expansion when compensating:
  an intrinsic movement of the weather radar system,
  a radiation width of the radar system (e.g. antenna halfwidth, beam width of the main lobe),
  an offset angle.

The weather radar system used can be designed to detect turbulent weather in a spatial area and to take a rough bearing. In this case, the calculation device is optionally designed to calculate the azimuth angle for each pixel of the spatial area relative to the rough bearing via the fine bearing. The compensation device is optionally designed to compensate for the intrinsic movement for each pixel of the spatial region (at least for all pixels that lie in a distance gate).

Embodiments also relate to a weather radar system having a previously defined device and an evaluation unit which is designed to receive radar signals and to generate the representation in the form of the range Doppler matrix based on the radar signals.

Optionally, the evaluation unit is designed to generate the representation using a pulse Doppler method.

Optionally, the evaluation unit is further designed to generate the representation in such a way that each pixel forms a Doppler value range (e.g. a so-called Doppler gate) and a distance value range (e.g. a so-called range gate). These areas can be freely selected and represent, for example, a discretization of the sensor data, i.e. all sensor data in a certain range is combined to form a value for the corresponding gate (range).

Optionally, the weather radar system further comprises an antenna system which has an antenna half-width that is greater than 3° or greater than 5° or greater than 10°. The antenna system is designed in particular as a directional antenna in order to send/receive radar signals in/from a specific spatial area in a targeted manner. Optionally, the antenna system can be pivoted through a pivot angle of a maximum of 40°. In particular, the weather radar system is not a stationary system, but a weather radar system which can be installed on an aircraft.

Optionally, the evaluation unit is designed to carry out a rough bearing based on a current alignment of the antenna system and an antenna characteristic. The calculation device can then be designed to carry out the fine bearing within the rough bearing.

The compensated representation can be provided by the apparatus of the evaluation unit. Optionally, the evaluation unit is then further designed to evaluate the compensated representation (e.g. as critical, less critical, and non-critical) and, based on this, to initiate at least one of the following reactions:

Representing turbulent weather in the spatial area on a display (in the aircraft or a flight control station for an exemplary drone), Warning of turbulent weather when a limit value is exceeded (acoustically, graphically, through color, etc.), Triggering an evasive maneuver for the aircraft to circumnavigate the spatial area.

Optionally, the weather radar system also includes the (graphical) display in order to represent turbulent weather in the spatial area based on the compensated representation.

Embodiments also relate to an aircraft having a weather radar system as was described above.

Embodiments also relate to a method for compensating for weather-independent Doppler expansions in radar signals of a weather radar system. The method comprises:

Receiving a representation of the radar signals, wherein the representation comprises pixels of a range Doppler matrix;

Calculating azimuth angles for the pixels by fine bearing;

Correcting weather-independent Doppler shifts for the pixels based on the calculated azimuth angle;

Compensating for the weather-independent Doppler expansions; and

Providing a compensated representation.

All of the functions of the apparatus and/or of the weather radar system described above can be carried out as optional further method steps in the method for compensation.

Embodiments offer an optimization of the weather warning function of a radar-controlled drone, wherein essential aspects can be summarized as follows. Every weather-monitoring radar should have a warning function against critical weather situations. A characteristic for the detection of critical weather situations can be a strong Doppler widening in the detected weather area. But there are also Doppler widenings in the radar measurement process itself, which can mask the effect to be detected. These Doppler widenings are in good approximation proportional to the intrinsic movement of the antenna-carrying aerial vehicle, 2) the sensitive antenna beam width, 3) the angular offset of the line of sight from the speed vector of the drone. A conventional ground-based weather radar does not know this measurement-related widening because its airspeed is zero. A conventional airliner is much less affected by this, since its antenna has a much narrower antenna beam width due to its size and the effect is therefore much smaller.

Radar-controlled drones, for which embodiments are particularly intended, fly very quickly. They are also small, so they have small radar antennas with a large antenna beam width. In effect, the Doppler of a retro-reflecting area is considerably larger at the front edge of the antenna beam than at the rear edge of the beam. This masks the weather-related Doppler widening to be measured.

Pulse Doppler radars, which are used according to embodiments, have a so-called range Doppler matrix (RD matrix) in the detection area of the radar lobe. This RD matrix divides the angular regions of the antenna beam with different Dopplers into approx. 10 different fine-angle areas over the receiving antenna region. According to the embodiments, these are measured via monopulse. Due to the known geometry, the measured Doppler change is well compensated for over the antenna beam width by subtraction.

A significant advantage of the embodiments is therefore the better detection of critical weather situations up to much higher offsets. The embodiments thus relate in particular to this compensation method, which helps against measurement-related Doppler expansion problems in small, fast drones.

The embodiments thus solve at least some of the problems mentioned at the outset in that the recorded radar signals are post-processed pixel by pixel, in such a way that the azimuth angle to the respective pixel is calculated via a fine bearing. Without a fine bearing, all Doppler values are assigned to the azimuth angle of the radar beam (rough bearing). With the more precise azimuth angle, a correction of weather-independent Doppler expansions can be compensated. In particular, an airspeed component, an offset (angular ranges to a flight direction) or also a beam width can be compensated, all of which can otherwise lead to Doppler widenings that do not depend on the weather. The radar signals can in particular be in the form of a 2-dimensional discrete representation, wherein each entry (which corresponds to a pixel) is assigned to a distance range and a frequency range (corresponding to a Doppler shift).

In contrast to the known weather radar systems, artifacts that arise as a result of the intrinsic movements of the weather radar system can be quickly compensated for in this way. The embodiments allow an expansion of conventional weather turbulence detection methods to fast, self-moving radar systems with a wide radar lobe, such as those used as part of an autonomously flying drone, so that a so-called sense-and-avoid mode (sense-and-avoid=detection and evasion) can be used effectively.

In this way, unnecessary evasive maneuvers can be avoided, since only weather-induced Doppler expansions are displayed—but not expansions due to the vehicle's airspeed, offset, and/or beam widths of radar signals. This means that weather scenarios without any turbulence (e.g. "warm steady rain") are not mistakenly detected as critical and can be flown through. The embodiments provide a clear separation between Doppler expansions that are caused by turbulence or solely by intrinsic movement. This means that really critical situations are detected much more precisely than is possible with conventional weather radar systems.

BRIEF DESCRIPTION OF THE DRAWINGS

The embodiments of the present invention will be better understood from the following detailed description and the accompanying drawings, which should not be construed as limiting the disclosure to the specific embodiments but are for explanation and understanding only.

DETAILED DESCRIPTION

Figure 1:
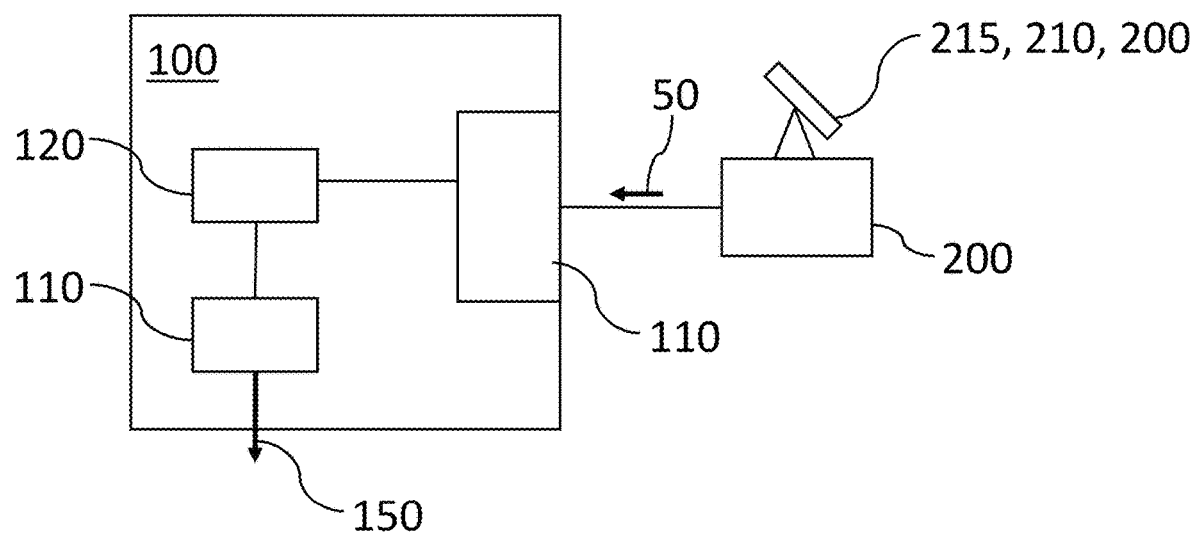
FIG. 1 shows an embodiment of an apparatus for compensating for weather-independent Doppler expansions.

FIG. 1 illustrates an embodiment for an apparatus 100 for compensating for weather-independent Doppler expansions in radar signals of a weather radar system 200. The radar signals can be obtained from an antenna system 215 and, after preprocessing, can be forwarded into a desired representation. The weather radar system 200 can also comprise antennas 210, 220 which are suitable for fine bearing (for example by means of a phase monopulse method).

The apparatus 100 comprises a receiving device 110 for receiving the representation 50 of the radar signals, wherein the representation comprises pixels of a range Doppler matrix. The apparatus 100 further comprises a calculation device 120 for performing a fine bearing of the azimuth angle for the pixels, which for this purpose can control the weather radar system 200, for example, so that it carries out the fine bearings for the pixels and sends corresponding data back to the apparatus 100. It is also possible that another system or other antennas that are not part of the weather radar system are used for fine bearing. Finally, the apparatus 100 comprises a compensation device 130 which is designed to correct weather-independent Doppler shifts for the pixels based on the calculated azimuth angle and thus to compensate for the weather-independent Doppler expansions. After the compensation, a compensated representation 150 can be provided.

Embodiments can, in particular, calculate the exact azimuth angle for each pixel shown (e.g. for a distance) using the fine bearing and use formulas to compensate for the airspeed of the flying object and the offset from the straight line direction, so that the Doppler widenings provide more accurate results.

Figure 2:
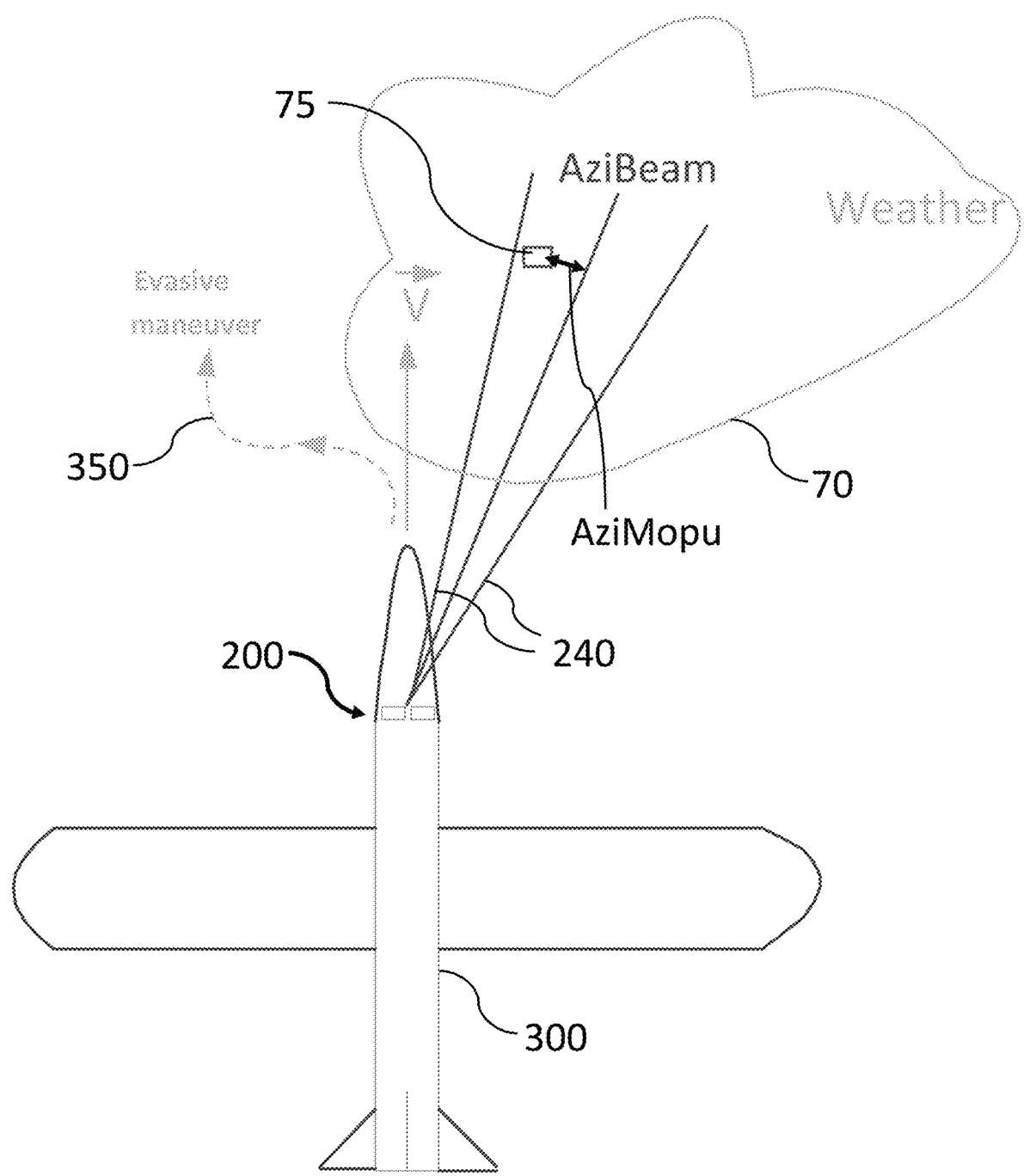
FIG. 2 shows a possible application scenario of the apparatus from FIG. 1.

FIG. 2 shows an example of an application of the apparatus 100 according to an embodiment for an aircraft 300 such as a drone (or in an airplane) that can have a considerable airspeed v in front of a potentially dangerous weather scenario 70, which should be avoided under radar control if necessary (for example along an evasive course 350).

For this purpose, a radar system 200 having, for example, two or more antennas 210, 220 is installed on an aircraft 300, which antennas are able to calculate a correction of the azimuth angle AziBeam via a fine bearing. For this purpose, the radar system 200 is in particular designed to emit the radar beam AziBeam with an antenna half-width 240 into the spatial region 70 and to receive signals from there. The spatial region 70 includes, for example, a turbulent weather situation which, as a result of the relative speed of the aircraft 300, not only leads to a Doppler shift of the radar signals, but can also lead to a widening (the Doppler expansion).

The aircraft 300 moves, for example, at its airspeed v and if the recorded spatial area 70 should have a dangerous weather situation, the flight object 300 can fly the evasive maneuver 350 based thereon to avoid flying through it. The evasive maneuver may be carried out purely automatically, controlled by radar.

One of the main features of critical rain areas is the strongly changing wind speed in the rain area, which is referred to below as "turbulence." This turbulence can be displayed with some larger on-board weather radar systems due to the different Doppler speeds in the reflections, and highlighted according to the strength (e.g. through color). However, this only works satisfactorily with small antenna half-widths (e.g. in the range of 3°). In radar devices having a larger antenna half-width, the half-width already inherently creates a Doppler widening of the reflected signals. This makes it difficult to detect the turbulence. Likewise, a Doppler expansion occurs in lateral offsets—due to the intrinsic movement and the width of the beam (beam width), and only because of the dynamics and not because of the scenario. This undesirable Doppler expansion masks the actual effect that is to be detected.

In order to avoid this negative effect, embodiments use the monopulse capability of modern devices in order to compensate for the above-mentioned inherent beam width-related Doppler expansion to a certain extent within the scope of the signal processing. This reduces the undesired effect, so that the Doppler expansion due to the weather can also be reliably measured at larger offset angles and evasive maneuvers can be carried out in good time.

In order to determine the critical weather situation, a fine bearing is carried out according to the embodiments, which fine bearing calculates the exact position of an exemplary pixel 75 within the antenna half-width 240. For this purpose, a phase monopulse method can be used, for example, in which one or more transmission pulse(s) are emitted and at least two receiving antennas 210, 220 receive reflected received signals in order to calculate a precise angle AziMopu of the pixel 75 as a fine bearing from a phase difference of the reflected received signals. The fine bearing can, for example, be calculated relative to a rough bearing AziBeam (=radiation direction of the antenna signal). The direction of view (rough bearing AziBeam) itself is also known.

When the precise azimuth angle AziMopu of the pixel 75 has been determined, the radar signals can be compensated using the known relative speed v and provided as a compensated representation 150 of the radar signals.

According to the embodiments, the radar beam is emitted with a beam width 240 in an azimuth angle AziBeam and is pivotable with a pivot angle of, for example, a maximum of 40 degrees (or in a range of 30 to 50 degrees measured from the airspeed vector v). The received radar signals are analyzed for each beam angle AziBeam and can be represented in a range Doppler matrix, so that the recorded spatial area includes a large number of pixels 75, each of which corresponds to a distance range (range gate) and a Doppler range (Doppler gate) and in their entirety form the range Doppler matrix. The Doppler range corresponds to the Doppler shift (e.g. frequency shift as a result of the relative movement) for the respective pixel. Since the transmitted signal has a certain frequency, the received signals should, if there is no turbulence, form more or less a frequency line in the range Doppler matrix in the forward direction. As already mentioned, a widening of this line can have various causes and the embodiments compensate for weather-independent effects.

Figure 3:
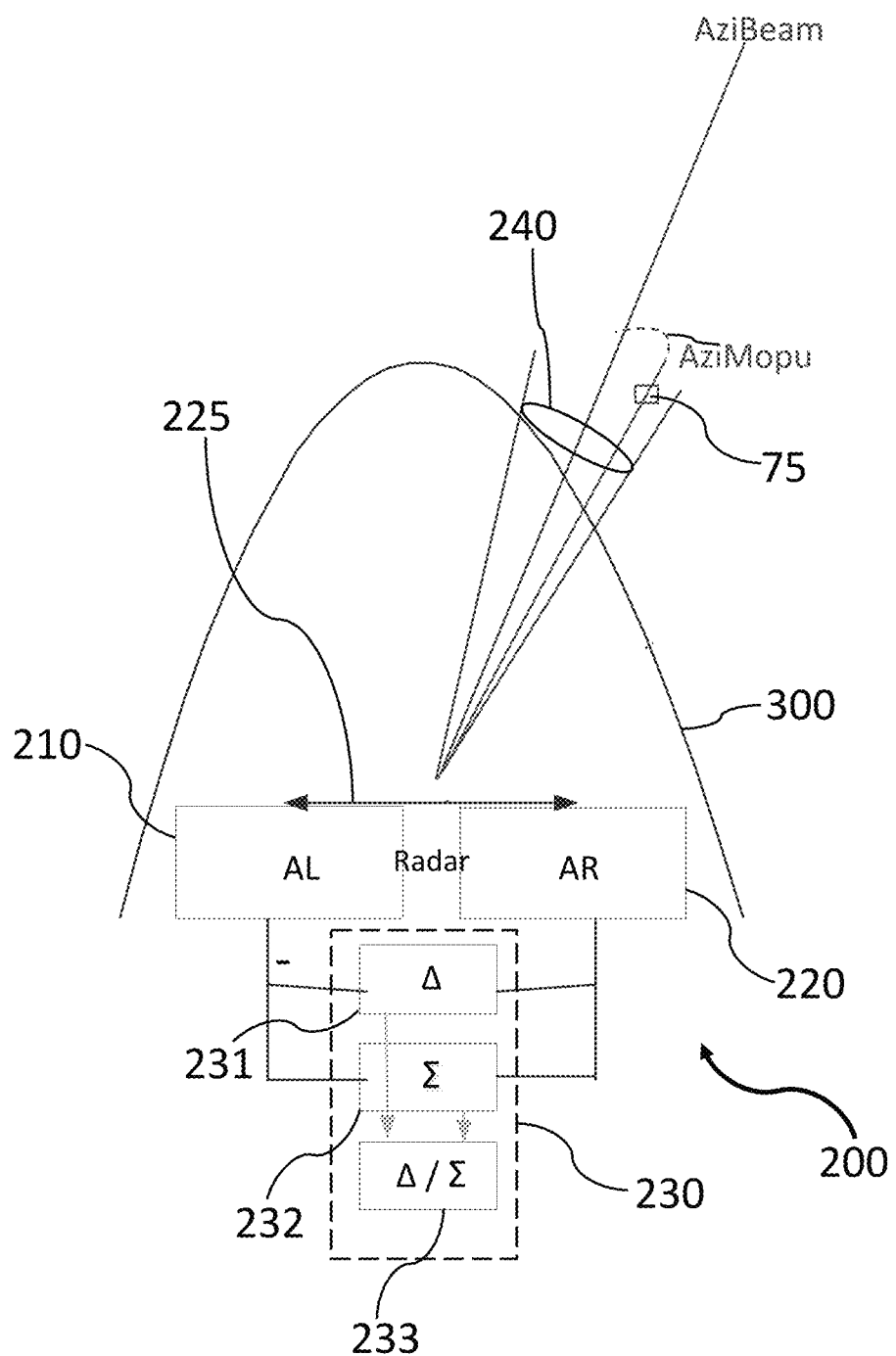
FIG. 3 illustrates further details for performing the fine bearing according to the embodiments.

FIG. 3 shows further details for performing the fine bearing in order to determine the azimuth angle AziMopu. For this purpose, FIG. 3 shows a front part of the aircraft 300 having the radar system 200. The radar system 200 comprises a first antenna 210 (for example, a left antenna AL) and a second antenna 220 (for example, right antenna AR), which are spaced apart from one another by a base width 225. The radar system 200 also includes an evaluation unit 230. The evaluation unit 230 comprises a device 231 for calculating differences and a device 232 for forming sums, which are designed to form sums/differences between the received signals of the first antenna 210 and the second antenna 220. In a detection device 233 of the evaluation unit 230, for example, a ratio can be formed from the difference signal and the sum signal, from which the fine bearing angle AziMopu for the pixel 75 is calculated or can be calculated by simple mathematical transformations.

With the help of the exact offset of the vehicle's own airspeed vector v, the Doppler effect can be calculated on the basis of its intrinsic movement and thus the position of each pixel in the range Doppler matrix can be changed (since the Doppler value changes) and thus compensated (the weather-independent component is excluded in the respective Doppler value). As a result, in the ideal case only a Doppler widening of the line will remain, which was caused by the weather.

The exact azimuth angle therefore results from:

$$Azi = AziBeam + AziMopu, \quad (1)$$

wherein AziBeam represents the angle according to the rough bearing and AziMopu represents the correction according to the fine bearing. With this azimuth angle Azi, the Doppler shift $fd_{DGAirspeed}$ is calculated, which is caused by the known airspeed v:

$$fd_{DGAirspeed} = \cos(Azi) * 2v/lambda, \quad (2)$$

wherein lambda is the radar wavelength (e.g. 0.03 m). This means that the purely weather-induced Doppler shift $fd_{DGcompensated}$ for the relevant Doppler gate (i.e. of the pixel 75) can be compensated for by forming the difference with the pixel value $fd_{DG}$ in the range Doppler matrix:

$$fd_{DGcompensated} = fd_{DG} - fd_{DGAirspeed}. \quad (3)$$

The Doppler expansion in Doppler gates (AziBeam, beam width, V) results for the situation from FIG. 2 from the difference between the Doppler values at the left and right azimuth edge of the radar beam (see edge lines of range 240):

Difference Doppler=

$$(\cos(AziBeam-\text{beam width}/2) - \cos(AziBeam+\text{beam width}/2))*2V/lamda = \sin(AziBeam)*\text{beam width}*2V/lamda = AziBeam*\text{beam width}*2V/lamda, \quad (4)$$

wherein a common Taylor approximation was used for small angles ($\sin(X)=X$ applies to small angles). In Doppler gates, this results in the straight line Doppler difference [DG]=AziBeam(beam width 2V/lamda)/DG width. (5)

For the exemplary values from Table 1 (see below) the following results:

Doppler difference [DG]=0.8DG*AziBeam [degrees]. (6)

TABLE 1 gives definitions of variables and representative sample values, as they were also used in the simulation below.

| Variable units [m, s, rad, Hz] | Meaning | Value range or value |
|---|---|---|
| AziBeam | Deviation of the beam center line of sight from the speed vector in the azimuth plane | [0.35] Here 10.7 |

TABLE 1-continued gives definitions of variables and representative sample values, as they were also used in the simulation below.

| Variable units [m, s, rad, Hz] | Meaning | Value range or value |
|---|---|---|
| Beam width | 3 dB one-way beam width in azimuth. | 10 |
| Base width | Distance partial antenna center points in azimuth | 0.115 |
| AziMopu | Azimuth in the beam, for which a fine bearing is taken here by monopulse | [−5.5] |
| Azi | Azimuth of the RD cell relative to the velocity vector The following applies here: Azi = AlphaBeam + AziMopu | <40 degrees |
| Phi | Half of the phase between right and left channel or phases between total antenna center (between the channels) and individual antenna center | [0.90] |
| D | Doppler | [0, prf] [0.3000] |
| DG | Doppler gate | |
| DG width | Width of Doppler gate | 46.875 each (width) |
| DGMax | Maximum DG | DG dimension RD matrix |
| R | Range (distance) | [0, 12000] |
| RG | Range gate | |
| RG width | | 150 each (width) |
| RGMax | Maximum evaluated RG | RG dimension RD matrix |
| v | Amount of speed, e.g. of the drone | 195 m/s (example) |
| S/N | Signal power to noise power | e.g. 100 linear or 20 dB |
| AL, AR | Signal amplitudes left or right antenna | |
| N | Noise power | |
| S | Signal power (here from a Doppler gate) | |
| ANxx ANRr, ANRi | Noise amplitudes, channels or "direction" real or imaginary | |
| ANLr, ANLi | e.g. NRr noise amplitude right channel (real part) | |
| ErrAzi | Calculated measurement error monopulse bearing | 0.34 |
| lambda | Radar wavelength | 0.03 |

Errors that occur are compensated for in accordance with further embodiments. For example, a fine bearing error of the pixel 75 may arise, which according to the phase monopulse method in azimuth can be expressed as follows:

$$AziError(Azi) = (lamda/(pi*\text{base width}))/(sqrt(2*S/N)), \quad (7)$$

wherein the base width is the antenna spacing for antennas 210, 220 for the phase monopulse direction bearing and S/N is the signal-to-noise ratio. This error estimate provides a tolerance range of, for example, +/−0.34 degrees for the values as they are mentioned in Table 1.

Another potential error lies in the calculation of the Doppler range (DGate). The width of a Doppler gate corresponds to an angle difference in azimuth in the example from Table 1 of approximately Beam width/number of DGs in the radar beam=10.7/9=1.2 degrees. (5)

In addition, a discretization error in degrees must be taken into account, which can be calculated in the example in Table 1 as follows:

deltaDiscreteDG=(beam width/DG)/sqrt(12)=(10.7/9)/3.46=0.34 degrees. (6)

The bearing error and the discretization error happen to be the same for S/N=20 dB. Both errors together correspond to about ½ the width of the Doppler gate. It is therefore to be expected that the ideal Doppler gate will often be flipped over to the left and right, which can be seen in the simulation of the radar signal processing in FIG. 4 below.

Figure 4:
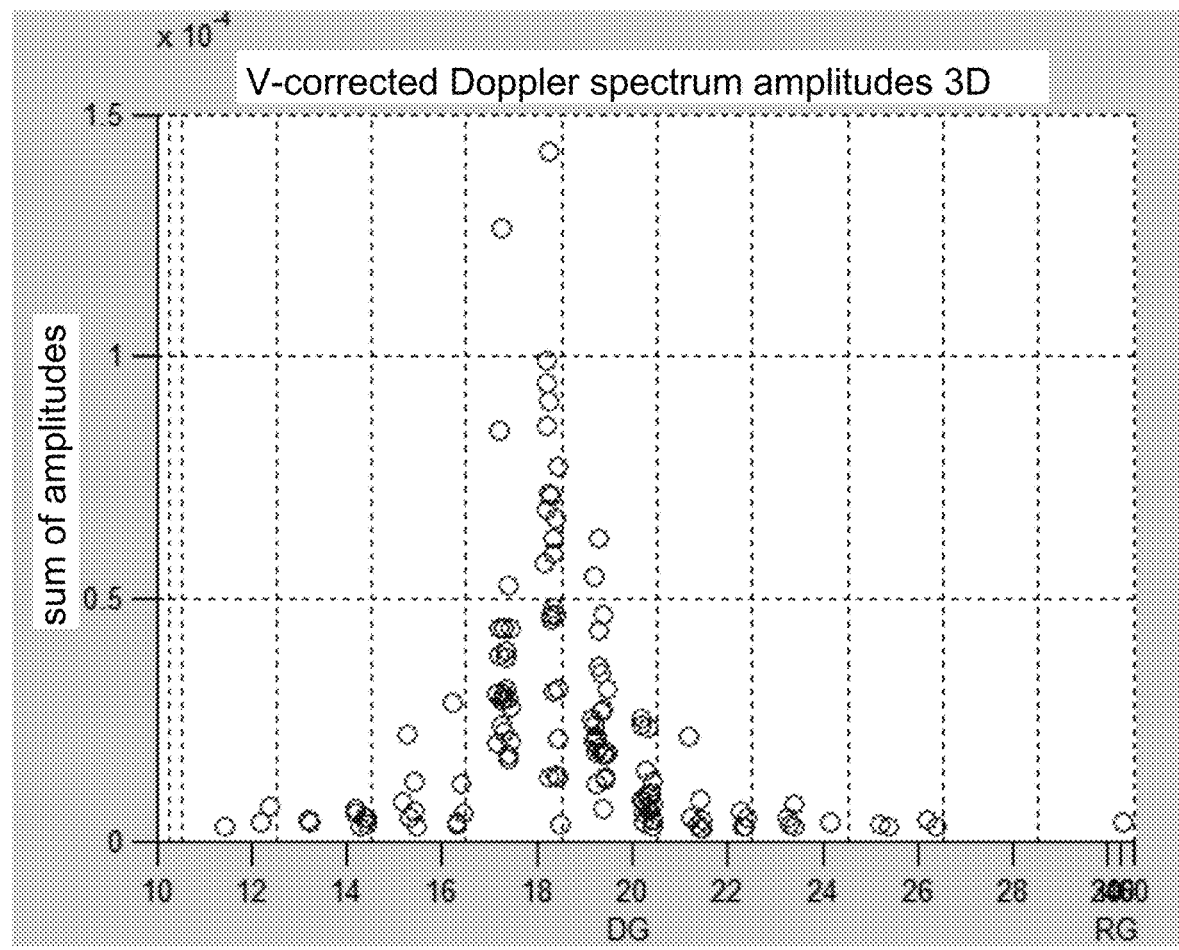
FIG. 4 shows an example of a simulation for radar signal processing.

FIG. 4 shows an example of a simulation for the radar signal processing. The dependence of the amplitude sum on the Doppler shifts is shown in detail. The signal-to-noise ratio S/N is approx. 20 dB and a widening of, for example, 9 Doppler gates without compensation was considerably reduced according to the embodiment by means of the compensation by fine bearing. The exemplary signals accumulate in a range between the Doppler gates 17 and 19. In the simulation, each Doppler gate has, for example, a frequency range of 46.875 Hz, with the maximum representing the Doppler shift as a result of the relative movement between the flying object and the rainy area and the widening being a measure of how strongly turbulence is present in the respective spatial area, some of which strengthens or weakens the Doppler shift. The weather-independent contributions to the Doppler widening were calculated out according to the embodiments.

The widening of a total of 9 Doppler gates in this example is reduced to approximately +/−1 Doppler gate by the compensation method according to embodiments, wherein a sigma of +/−4.5 Doppler gates was assumed. Therefore, the embodiments provide an improvement by a factor of approximately 4.

Figure 5:
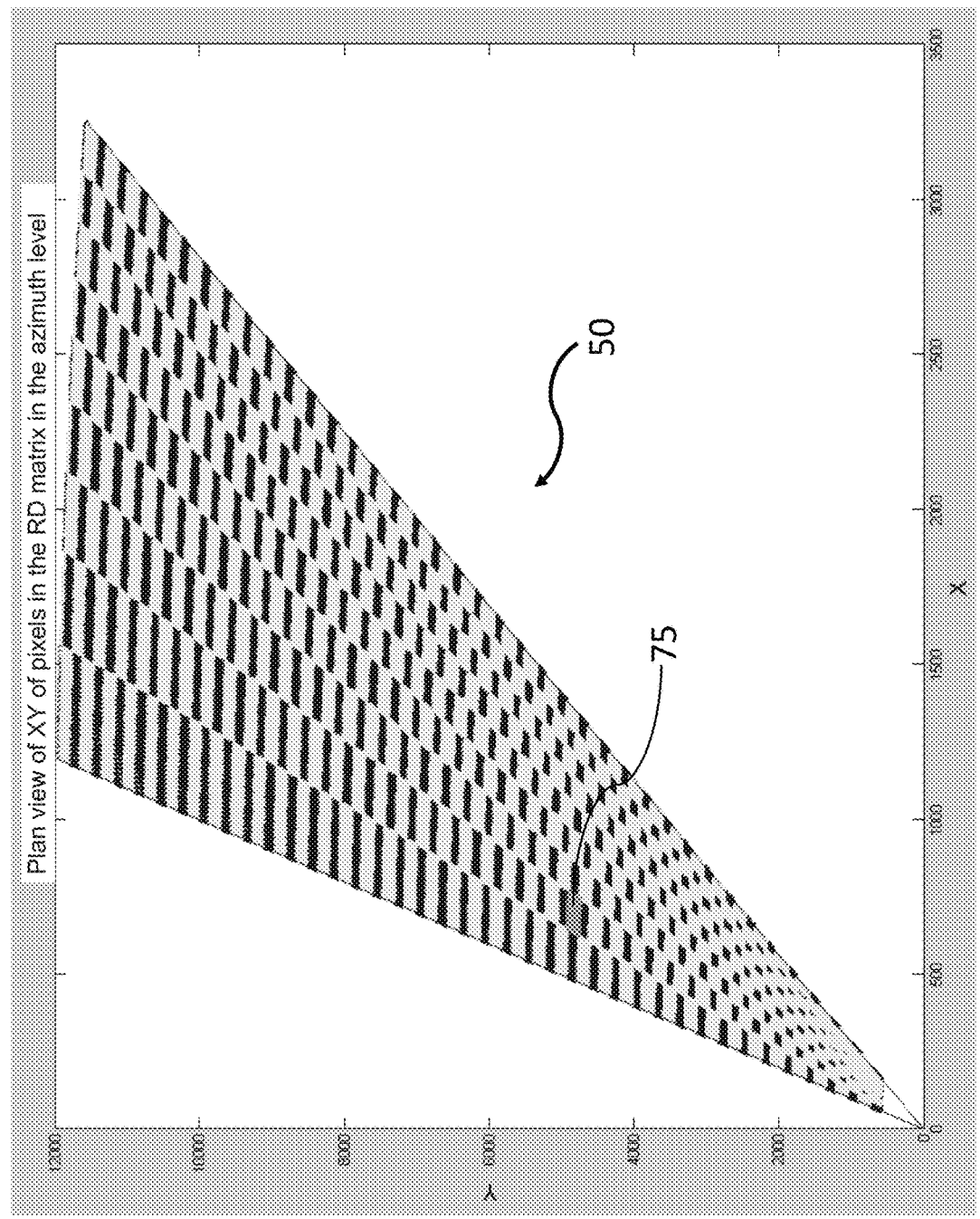
FIG. 5 shows an exemplary top view (azimuth plane) of the individual pixels in the recorded angular space area.

FIG. 5 shows an exemplary top view (azimuth plane) of the individual pixels in the recorded angular space area 240 which is illuminated by the antenna (for example, +/−3 dB sensitivity range of the antenna). The approach geometry can be taken from FIG. 2 and the underlying exemplary values can be taken from Table 1. In this representation 50, each box is a pixel which correlates to a specific distance and an azimuth angle and for which the Doppler shift is calculated.

The number of Doppler cells in the antenna pattern corresponds to the Doppler widening due to the radar's intrinsic movement in the beam. It is similar to a radar with a synthetic aperture (SAR system), but it also includes scenarios in which there are weather areas with added speed vectors of great variability.

Figure 6:
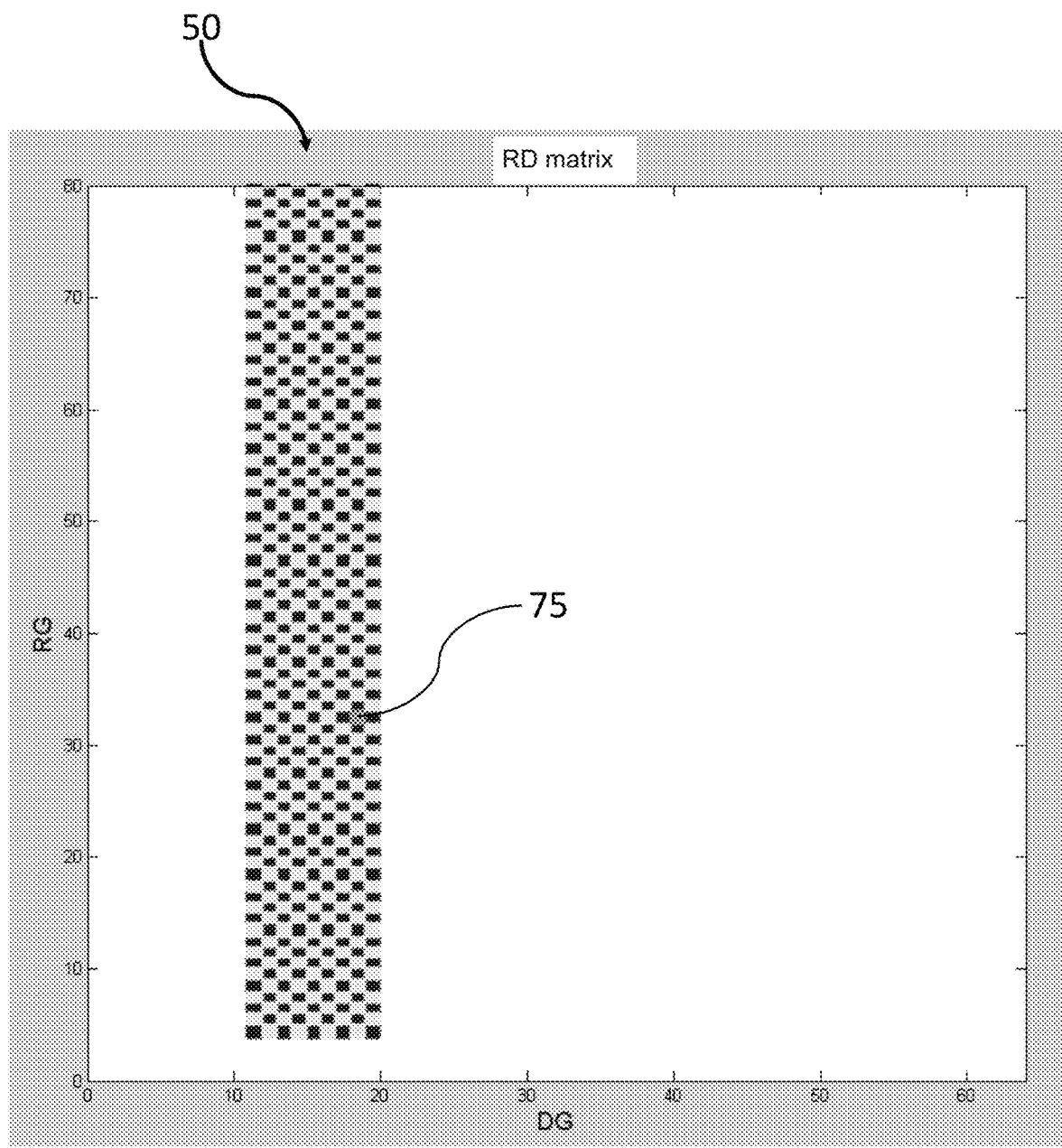
FIG. 6 shows for example, a range Doppler matrix as used in the embodiments to represent the radar signals.

FIG. 6 shows, by way of example, a range Doppler matrix 50 as it is used in the embodiments as a representation 50 of the radar signals. The grid pattern of pixels is now not shown in the plan view (as in FIG. 5), but directly in relation to the distance and Doppler areas. The distance ranges (range gates) are shown on the vertical axis and the Doppler ranges (Doppler gates) are shown on the horizontal axis, wherein 9 Doppler gates are used for example, each with a frequency bandwidth of approx. 46 Hz. The exemplary pixel 75 is indicated again, with a distance value 32 and a Doppler value 19. For the example used, this means that the spatial area to the pixel is 32 distance gates of each 150 m wide (i.e. approx. 4.8 km distance) and has a Doppler shift of 19 Doppler gates of each approx. 46 Hz (i.e. a Doppler shift of, for example, 874 Hz), wherein the exemplary radar wavelength is 3 cm.

Figure 7:
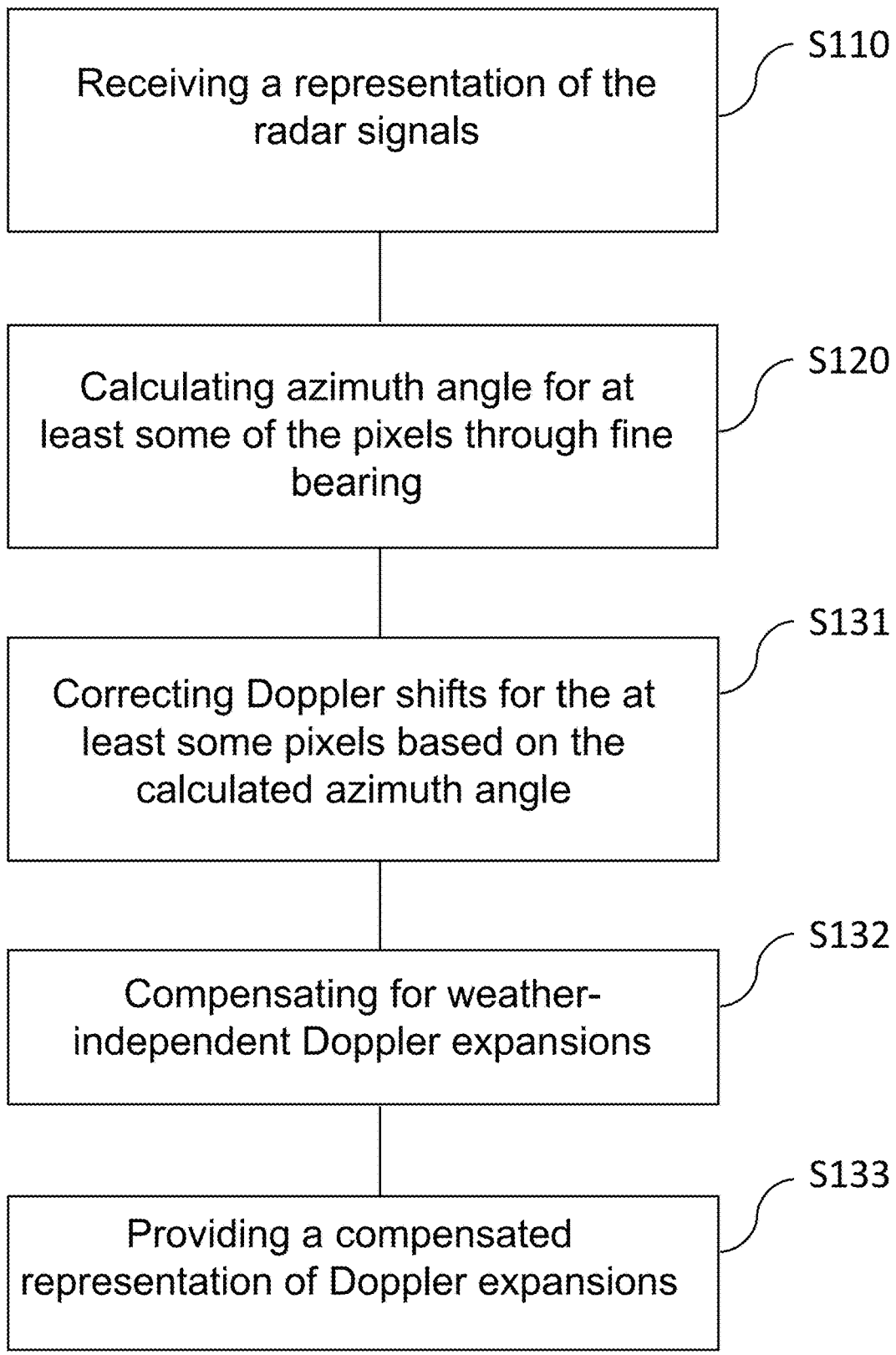
FIG. 7 shows a flow diagram for a method for compensating for weather-independent Doppler expansions according to the embodiments.

FIG. 7 shows a flow chart for a method for compensating for weather-independent Doppler expansions in radar signals of a weather radar system 200. The method comprises:

Receiving S110 a representation 50 of the radar signals, wherein the representation 50 comprises pixels of a range Doppler matrix;

Calculating S120 azimuth angle Azi for the pixels 75 by fine bearing;

Correcting S131 weather-independent Doppler shifts for the pixels 75 based on the calculated azimuth angle Azi; AziMopu;

Compensating S132 for the weather-independent Doppler expansions; and

Providing S133 a compensated representation 150.

As further optional steps, the method can include all functionalities as described for the apparatus or the weather radar system.

Advantages of the embodiments can be summarized as follows:

Due to the compensation according to the embodiments, critical weather conditions can be reliably recognized at larger offset angles AziBeam from the speed vector v. In the quantitative estimation, it should be noted on the one hand that the weather-independent widening effect should be smaller than the critical sigma caused by the weather (standard deviation, i.e. weather-related widening) of at least 2-3 Doppler gates.

In addition, there is a linear relationship between an angular expansion deltaDG in Doppler gates and the offset angle AziBeam from the velocity vector of:

$$\text{deltaDG}=0.8*\text{offset angle}. \qquad (8)$$

Without compensation, the critical 2-3 Doppler gates mean that offset angles of 3 to 4.5 degrees would be permitted. Weather-related widenings could still be reliably detected in this range. The compensation according to the embodiments leads to an improvement by a factor of 4 (see above), so that with compensation, offset angles of 12 to 18 degrees would be permitted (because of the linearity). This is a significant increase in the offset angle from the speed vector v, at which a critical weather situation should be able to be reliably detected. This also improves the overall success of evasive maneuvers.

Overall, the Doppler expansions due to the turbulent weather can thus be measured even at higher offset angles, and evasive maneuvers can be flown in good time before the "weather" so as not to damage the autonomously flying drone 300, as an example. The method enables smaller on-board radar systems (e.g. 25 cm antenna size) to be able to detect turbulence, which for conventional on-board weather radar systems without monopulse capability would require an antenna size in the range of more than 50 cm.

The features of the invention disclosed in the description, the claims, and the drawings may be essential for the realization of the invention either individually or in any combination.

LIST OF REFERENCE SIGNS

50 Representation of radar signals (e.g. as a range Doppler matrix)
70 Recorded spatial area
75 Pixels of the representation
100 Compensation apparatus
110 Receiving device
120 Calculation device
130 Compensation device
150 Compensated representation based on compensated radar signals
200 Weather radar system
215 Antenna system
210, 220 Antennas for a monopulse method
225 Base width of the monopulse antennas 230 Evaluation device
231, 232, . . . Components of the evaluation device
240 Beam width of the antenna system
300 Aircraft (drone, airplane, helicopter, etc.)
350 Evasive maneuvers
Azi Azimuth angle
AziBeam Rough bearing for azimuth angle
AziMopu Fine bearing for azimuth angle
v Relative speed (speed vector)

The invention claimed is:

1. An apparatus for compensating for weather-independent Doppler expansions in radar signals of a weather radar system, the apparatus comprising:
 a receiving device for receiving a representation of the radar signals, wherein the representation comprises pixels of a range Doppler matrix;
 a calculation device which is configured to calculate azimuth angles (Azi) for the pixels by fine bearing; and
 a compensation device which is designed to correct weather-independent Doppler shifts for the pixels based on the calculated azimuth angle (Azi; AziMopu) and thus to compensate for the weather-independent Doppler expansions and to provide them as a compensated representation.

2. The apparatus according to claim 1, wherein the calculation device is designed to use a phase monopulse method for fine bearing.

3. The apparatus according to claim 2, wherein the compensation device is designed to take into account one or more of the following causes for the weather-independent Doppler expansions when compensating:
 an intrinsic movement (v) of the weather radar system,
 a beam width,
 an offset angle (AziBeam).

4. The apparatus according to claim 3
 wherein the weather radar system is designed to detect turbulent weather in a spatial area and to take a rough bearing (AziBeam),
 and wherein the calculation device is designed to calculate the azimuth angle (AziMopu) for each pixel of the spatial area relative to the rough bearing (AziBeam) via the fine bearing, and
 the compensation device is designed to compensate for the intrinsic movement (v) for each pixel of the spatial region.

5. A weather radar system having:
 an evaluation unit which is designed to receive radar signals and to generate the representation in the form of the range Doppler matrix based on the radar signals; and
 an apparatus according to claim 1.

6. The weather radar system according to claim 5, wherein the evaluation unit is designed to generate the representation using a pulse Doppler method.

7. The weather radar system according to claim 5, wherein the evaluation unit is designed to generate the representation in such a way that each pixel forms a Doppler value range and a distance value range.

8. The weather radar system according to claim 5, which further comprises an antenna system having an antenna half-width that is greater than 3° or greater than 5° or greater than 10°.

9. The weather radar system according to claim 8, wherein the antenna system is pivotable through a pivot angle of a maximum of 40°.

10. The weather radar system according to claim 5,
 wherein the evaluation unit is designed to initiate a rough bearing based on a current orientation of the antenna system and an antenna characteristic, and
 wherein the calculation device is designed to initiate the fine bearing within the rough bearing.

11. The weather radar system according to claim 5, wherein the evaluation unit is further designed to evaluate the compensated representation and, based thereon, to cause at least one of the following reactions:
 Representing turbulent weather in the spatial region on a display,
 Warning of turbulent weather when a threshold value is exceeded,
 Triggering an evasive maneuver for the aircraft to fly around the spatial area.

12. Aircraft with a weather radar system according to claim 5.

13. A method for compensating for weather-independent Doppler expansions in radar signals of a weather radar system, wherein the method comprises:
 Receiving a representation of the radar signals, wherein the representation comprises pixels of a range Doppler matrix;
 Calculating azimuth angles (Azi) for the pixels by fine bearing;
 Correcting weather-independent Doppler shifts for the pixels based on the calculated azimuth angle (Azi; AziMopu);
 Compensating for the weather-independent Doppler expansions; and
 Providing a compensated representation.

14. The apparatus according to claim 1, wherein the compensation device is designed to take into account one or more of the following causes for the weather-independent Doppler expansions when compensating:
 an intrinsic movement (v) of the weather radar system,
 a beam width,
 an offset angle (AziBeam).

* * * * *